United States Patent
Kawamata

(10) Patent No.: US 10,331,326 B2
(45) Date of Patent: Jun. 25, 2019

(54) APPARATUS THAT CONTROLS SCROLLING OPERATION PAST AN EDGE OF AN IMAGE BASED ON A TYPE OF USER INPUT

(75) Inventor: Wataru Kawamata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 582 days.

(21) Appl. No.: 14/237,405

(22) PCT Filed: Aug. 21, 2012

(86) PCT No.: PCT/JP2012/005234
§ 371 (c)(1),
(2), (4) Date: Feb. 6, 2014

(87) PCT Pub. No.: WO2013/031135
PCT Pub. Date: Mar. 7, 2013

(65) Prior Publication Data
US 2014/0189580 A1    Jul. 3, 2014

(30) Foreign Application Priority Data
Sep. 1, 2011    (JP) .................. 2011-191143

(51) Int. Cl.
*G06F 3/0485*    (2013.01)
*G06F 3/0482*    (2013.01)
*G06F 3/0488*    (2013.01)

(52) U.S. Cl.
CPC .......... *G06F 3/0485* (2013.01); *G06F 3/0482* (2013.01); *G06F 3/0488* (2013.01)

(58) Field of Classification Search
CPC .................... G09G 5/14; G09G 5/34
USPC ........................................... 715/784
See application file for complete search history.

(56) References Cited

U.S. PATENT DOCUMENTS

| | | | |
|---|---|---|---|
| 6,005,573 A | 12/1999 | Beyda et al. | |
| 8,910,073 B2 * | 12/2014 | Mercer | G06F 3/0485 382/174 |
| 9,104,440 B2 * | 8/2015 | Jarrett | G06F 3/04883 |
| 2002/0063738 A1 | 5/2002 | Chung | |
| 2004/0150630 A1 * | 8/2004 | Hinckley | G06F 3/0418 345/173 |
| 2010/0313125 A1 * | 12/2010 | Fleizach | G06F 3/04883 715/702 |
| 2011/0050629 A1 | 3/2011 | Homma et al. | |

(Continued)

FOREIGN PATENT DOCUMENTS

| | | |
|---|---|---|
| CN | 101384047 A | 3/2009 |
| JP | 2006-252366 | 9/2006 |

(Continued)

OTHER PUBLICATIONS

Extended European Search Report dated Feb. 9, 2015 in Patent Application No. 12826857.0.

(Continued)

*Primary Examiner* — Joy M Weber
(74) *Attorney, Agent, or Firm* — Xsensus, LLP

(57) ABSTRACT

An apparatus that includes circuitry that controls a display to display an image having a first edge and a second edge, the second edge on an opposite side of the image from the first edge, scroll through the image from the first edge to the second edge in response to a first user input, and continue scrolling past the second edge in response to a second user input, and the second user input is different than the first user input.

15 Claims, 12 Drawing Sheets

(56) References Cited

U.S. PATENT DOCUMENTS

| | | | |
|---|---|---|---|
| 2011/0090255 A1 | 4/2011 | Wilson et al. | |
| 2011/0093812 A1 | 4/2011 | Fong | |
| 2011/0107264 A1* | 5/2011 | Akella | G06F 3/0482 715/830 |
| 2011/0202859 A1* | 8/2011 | Fong | G06F 3/04883 715/769 |
| 2011/0252362 A1 | 10/2011 | Cho et al. | |
| 2012/0272181 A1* | 10/2012 | Rogers | G06F 3/0482 715/784 |

FOREIGN PATENT DOCUMENTS

| | | |
|---|---|---|
| JP | 2007-94978 A | 4/2007 |
| JP | 2008-70968 A | 3/2008 |
| JP | 2009-259163 A | 11/2009 |
| JP | 2011-53971 A | 3/2011 |
| JP | 2011-166804 | 8/2011 |

OTHER PUBLICATIONS

Office Action dated Jun. 30, 2015 in Japanese Patent Application No. 2011-191143.

International Search Report dated Nov. 27, 2012, in PCT/JP2012/005234.

Combined Chinese Office Action and Search Report dated May 4, 2016 in Patent Application No. 201280041028.9 (with English language translation).

* cited by examiner

[Fig. 1]
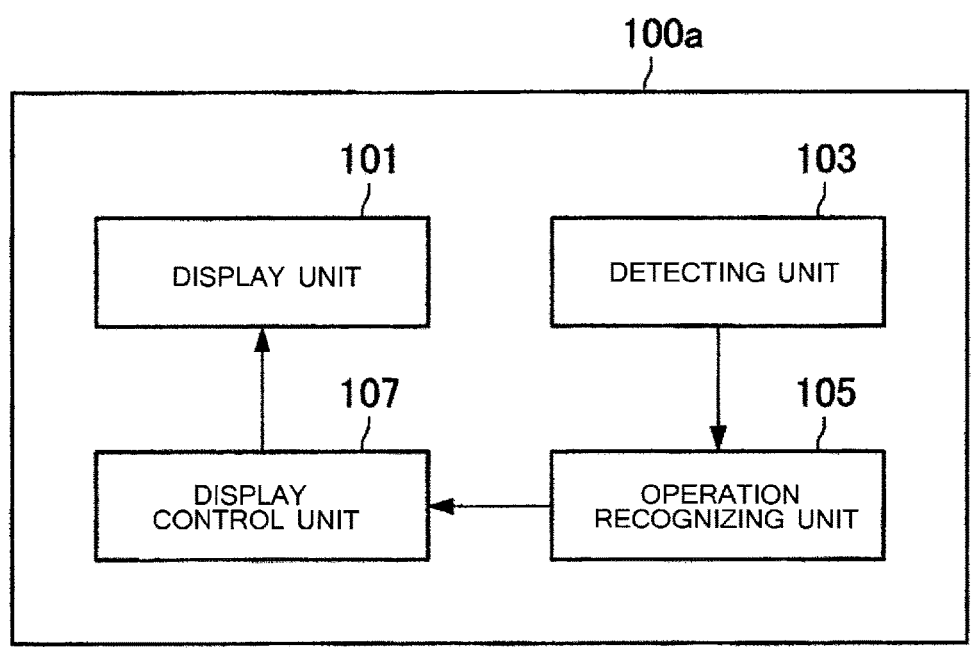

[Fig. 2]
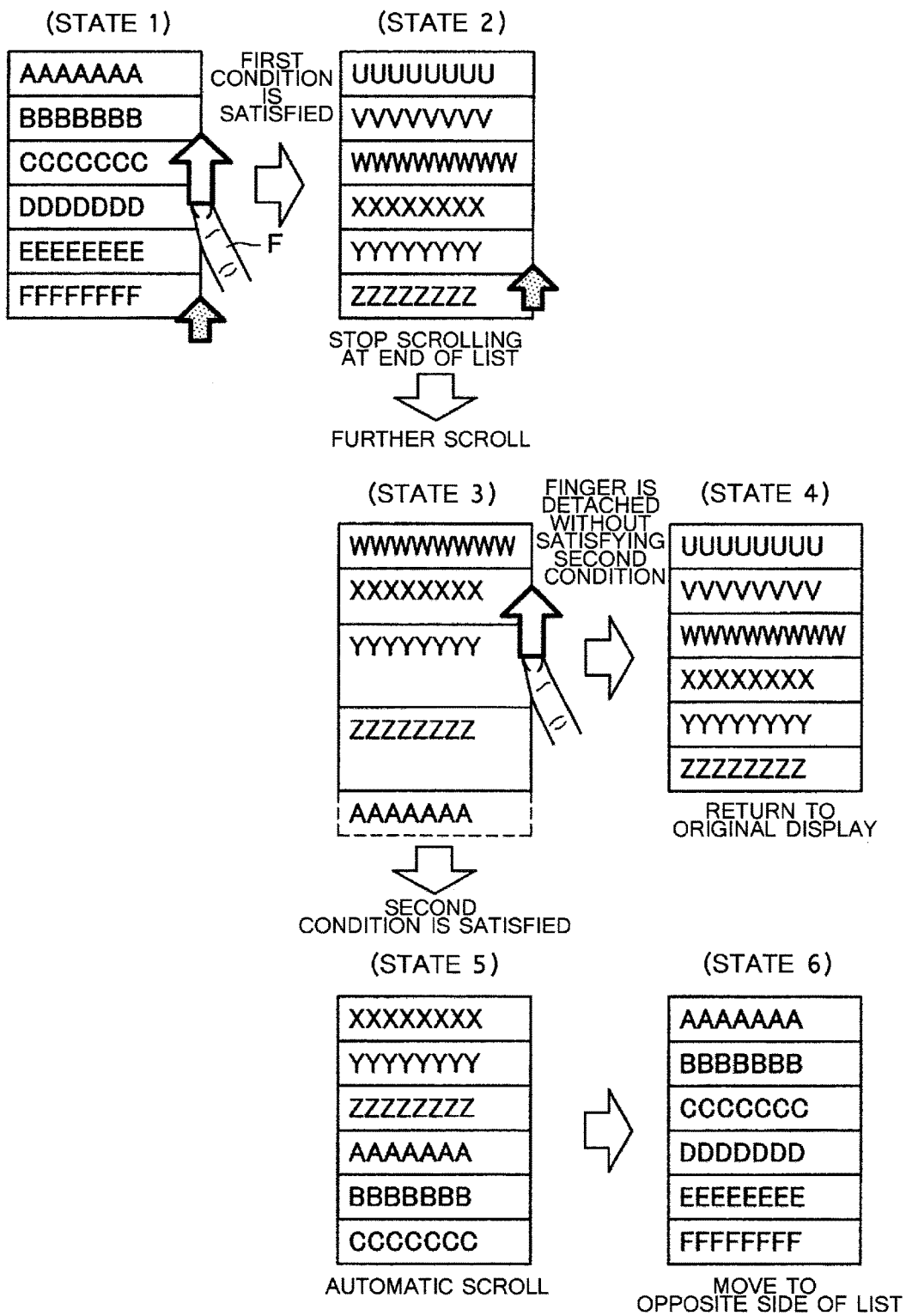

[Fig. 3]
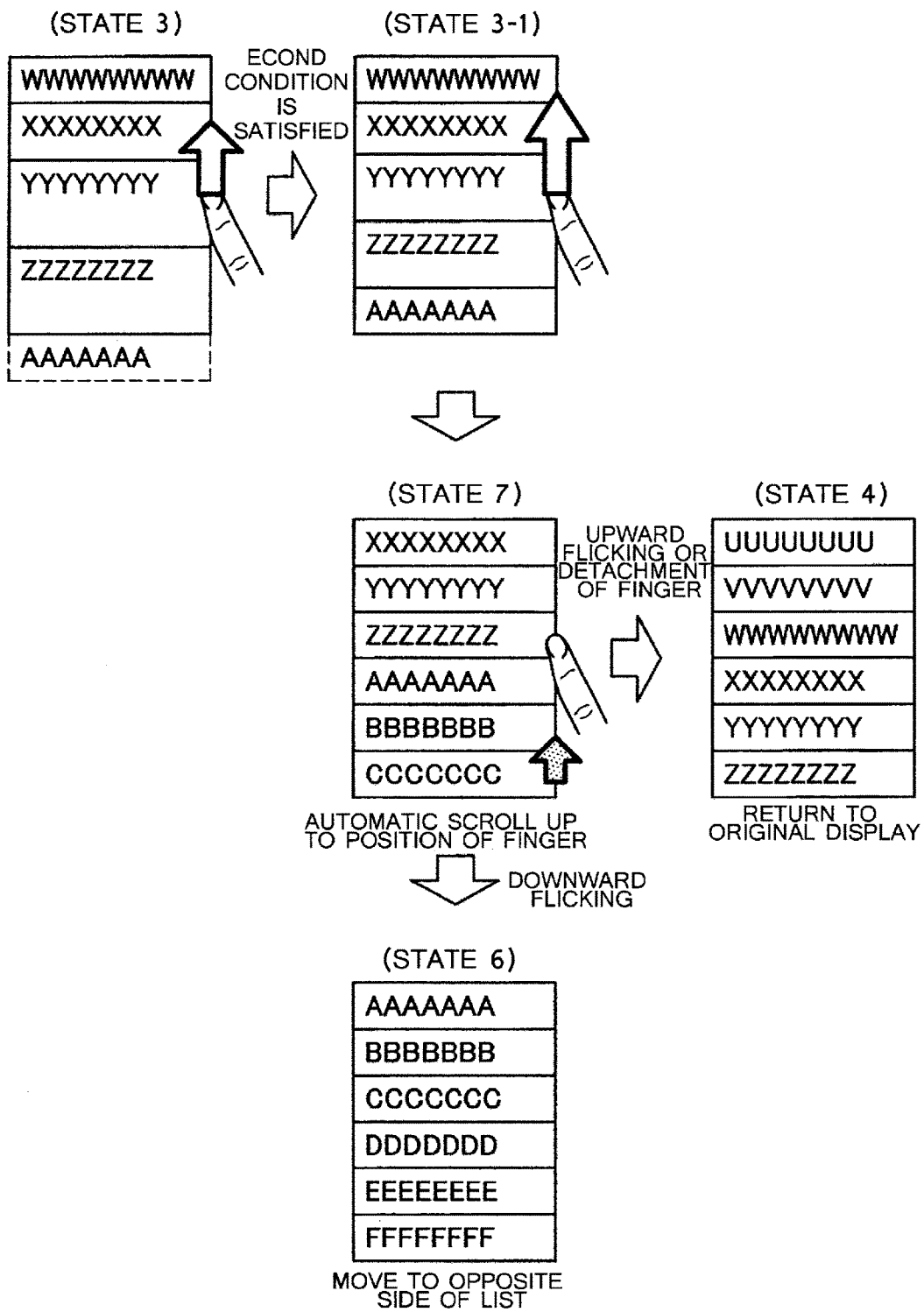

[Fig. 4]
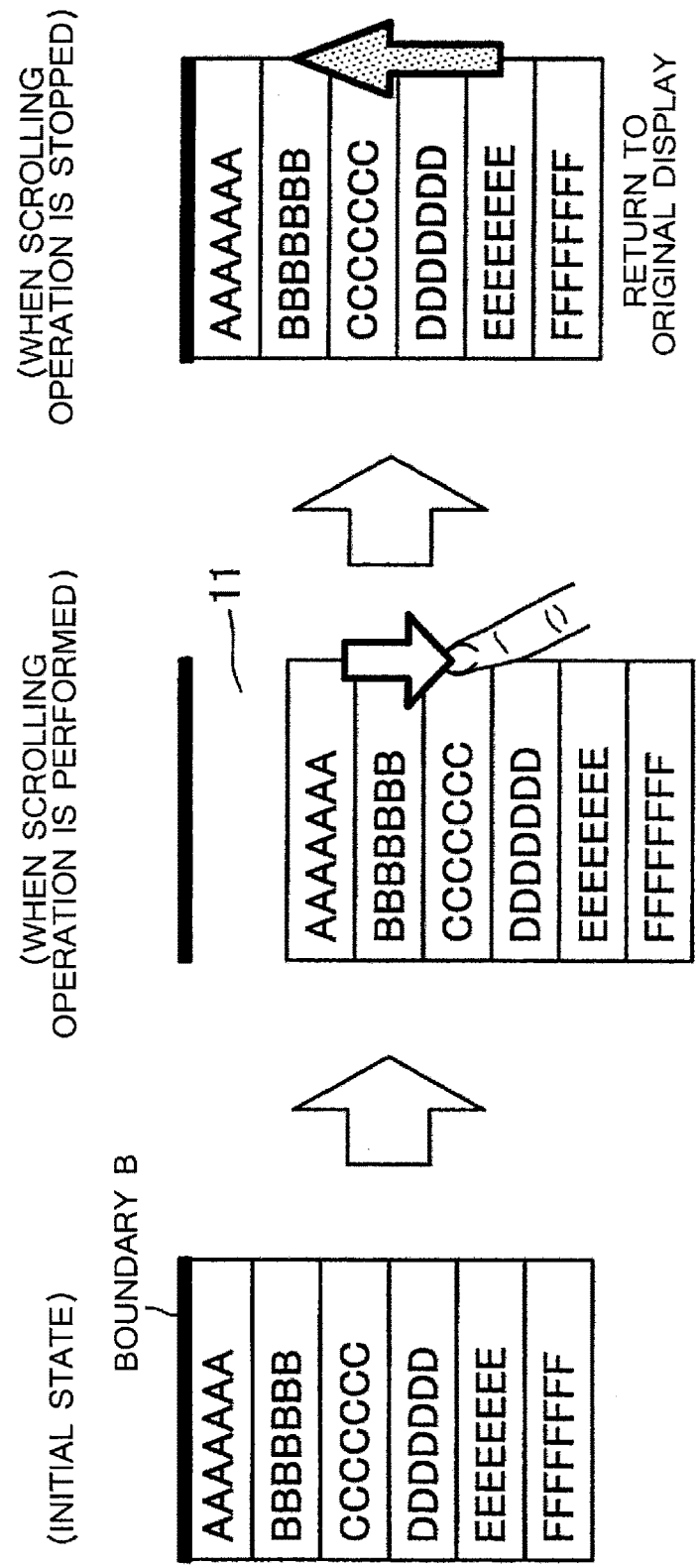

[Fig. 5]
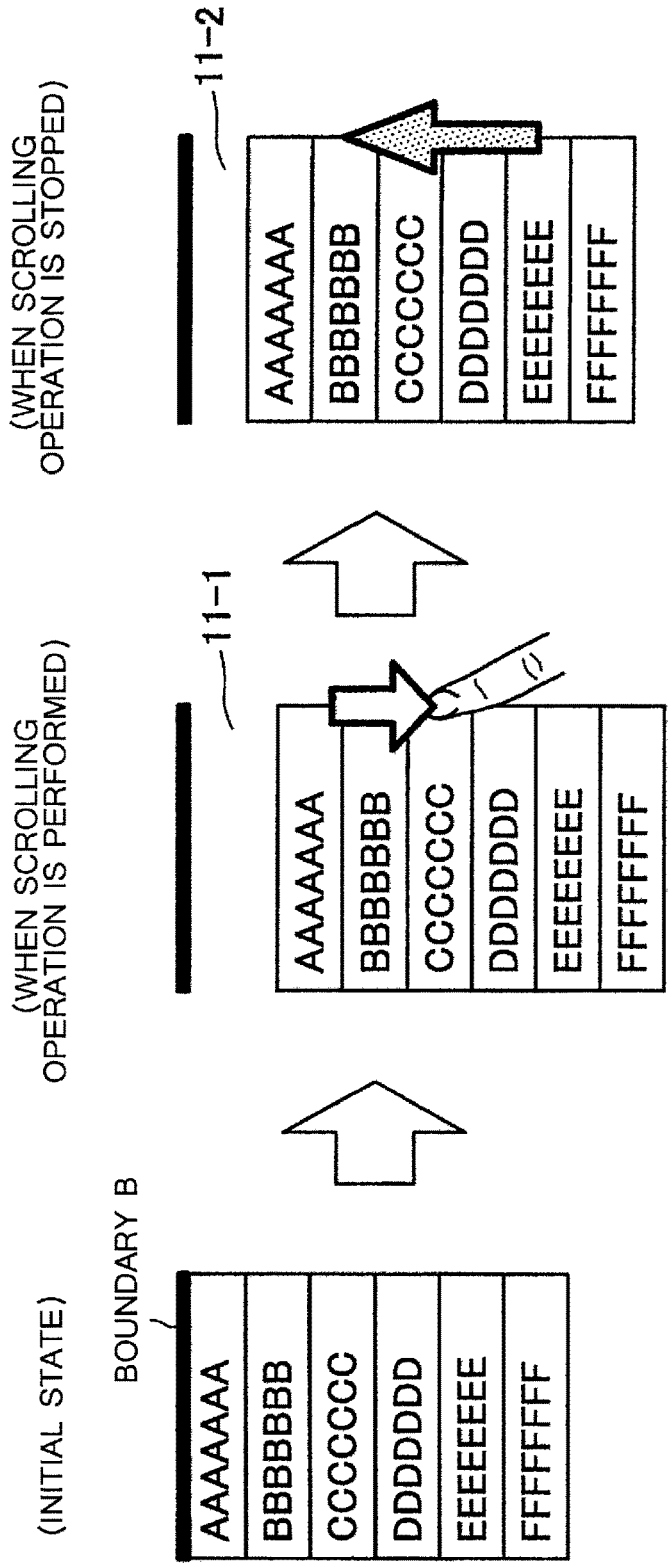

[Fig. 6]
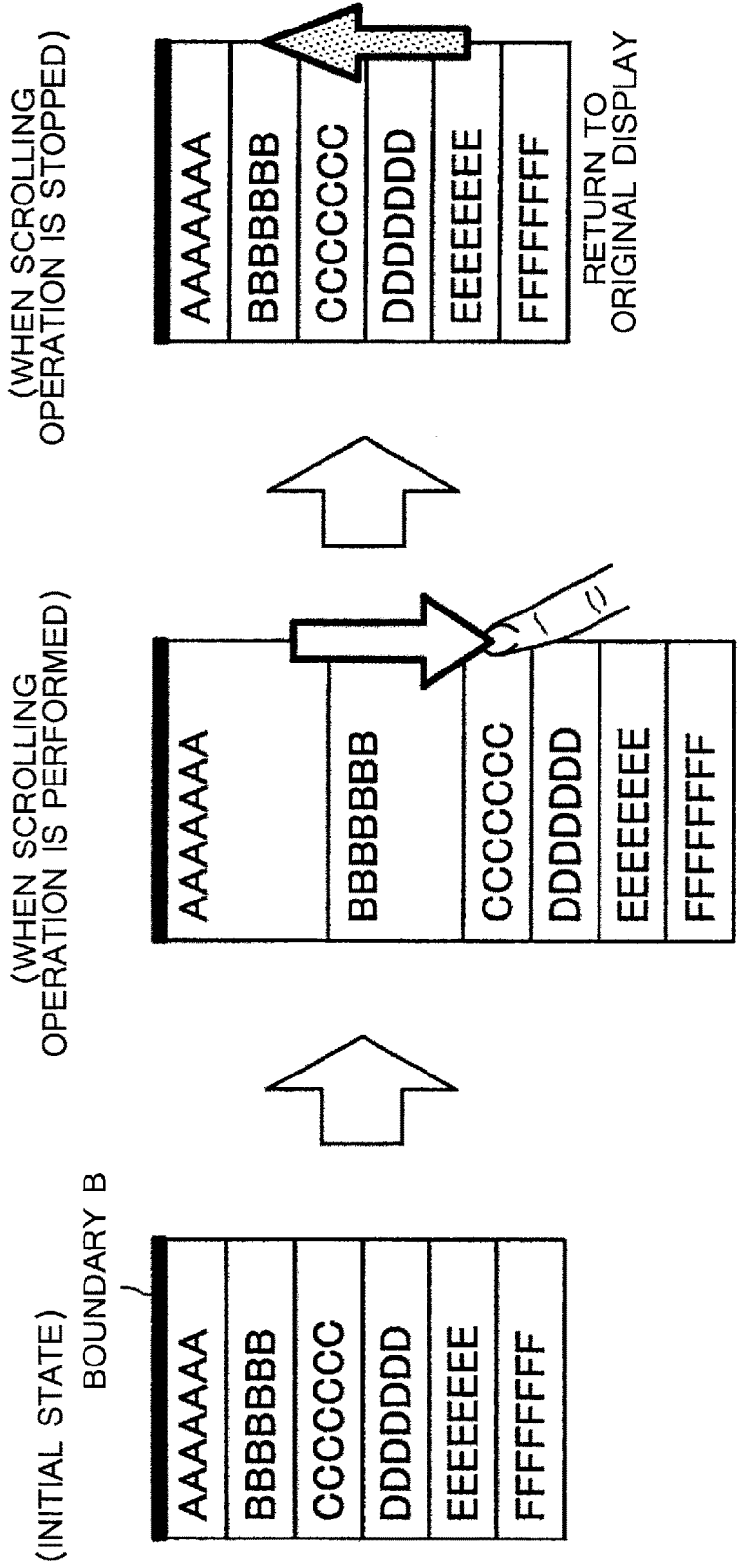

[Fig. 7]
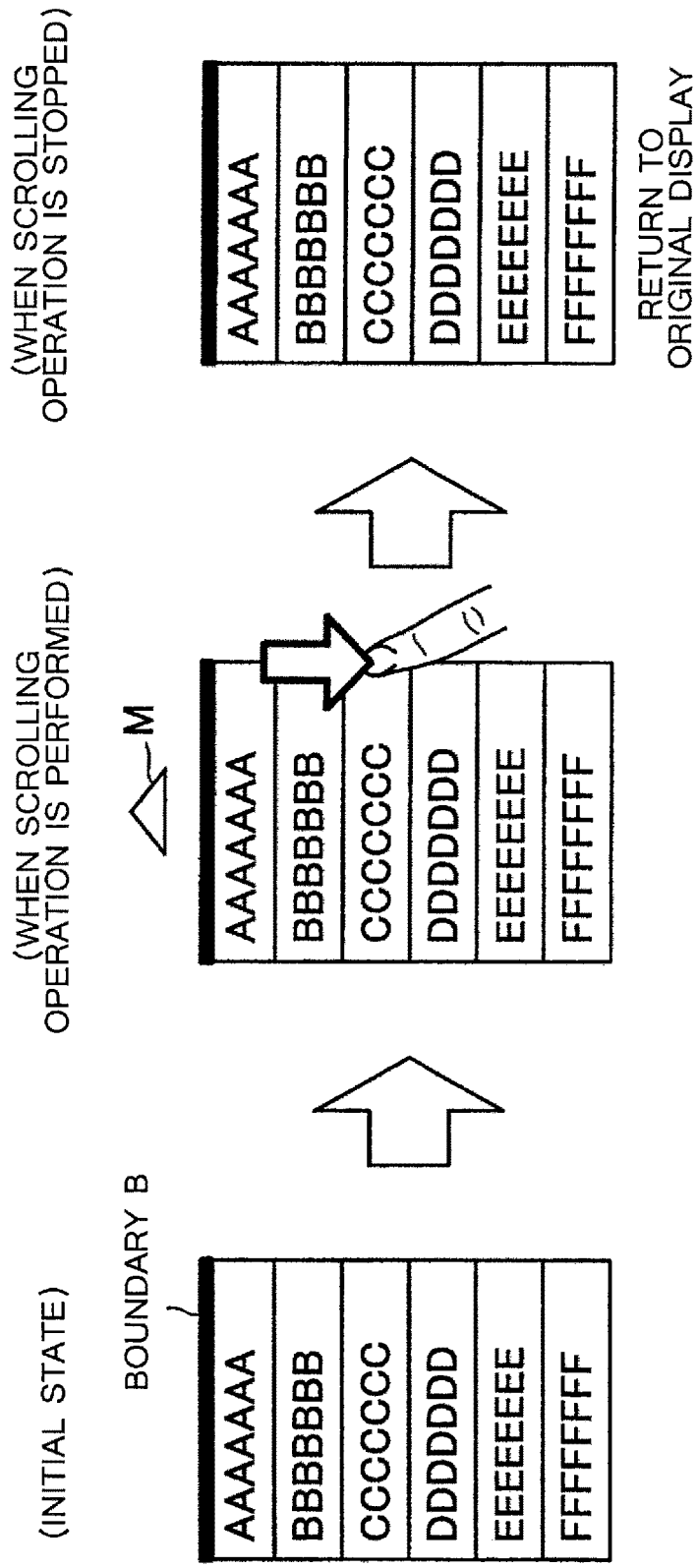

[Fig. 8]
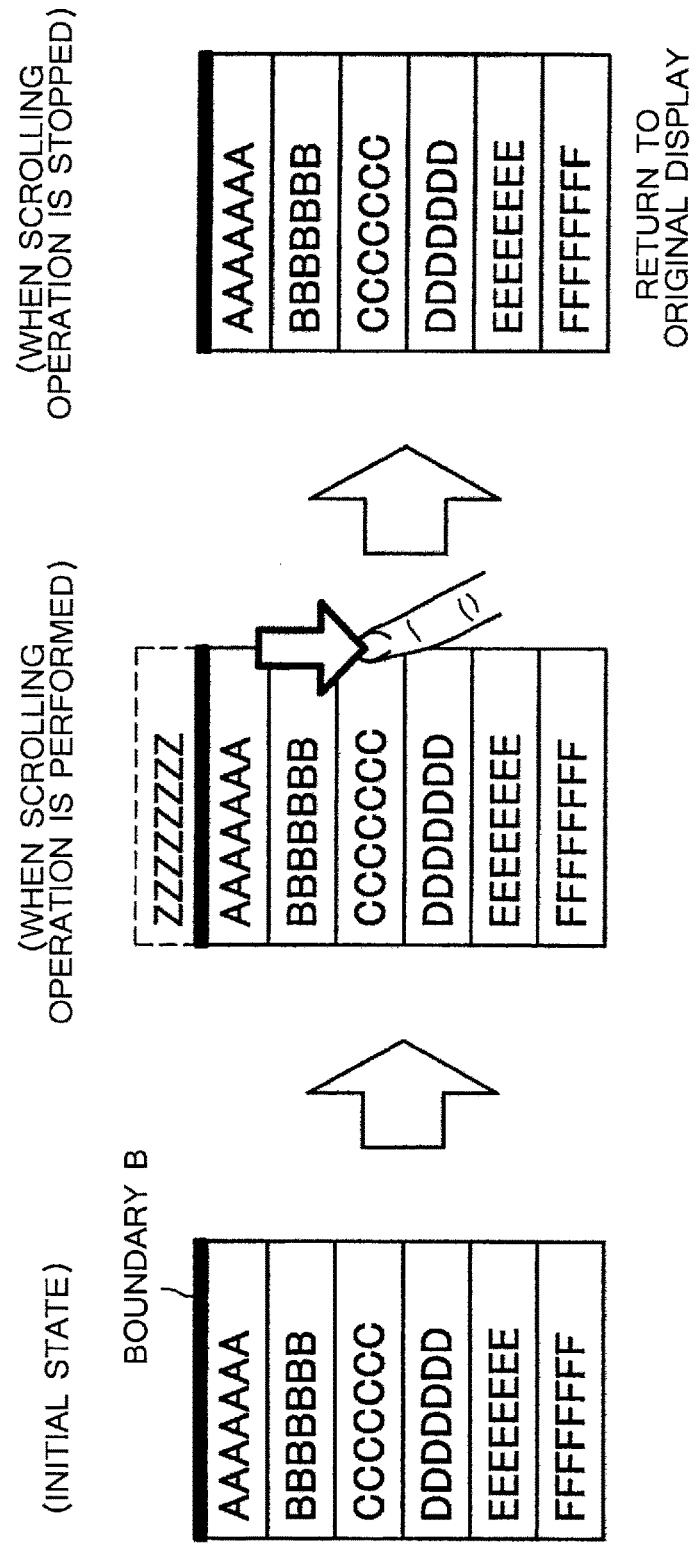

[Fig. 9]
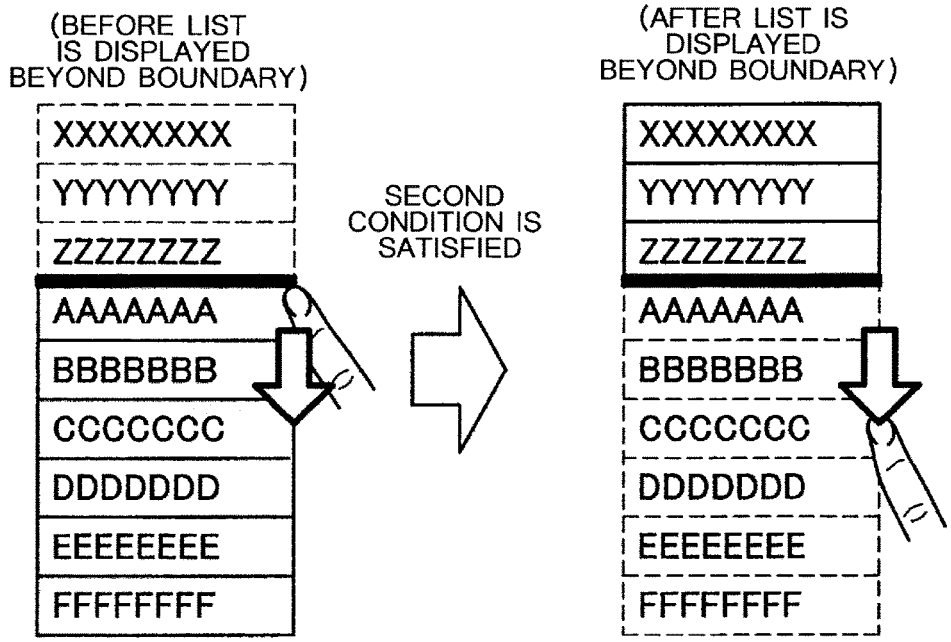
[Fig. 10]
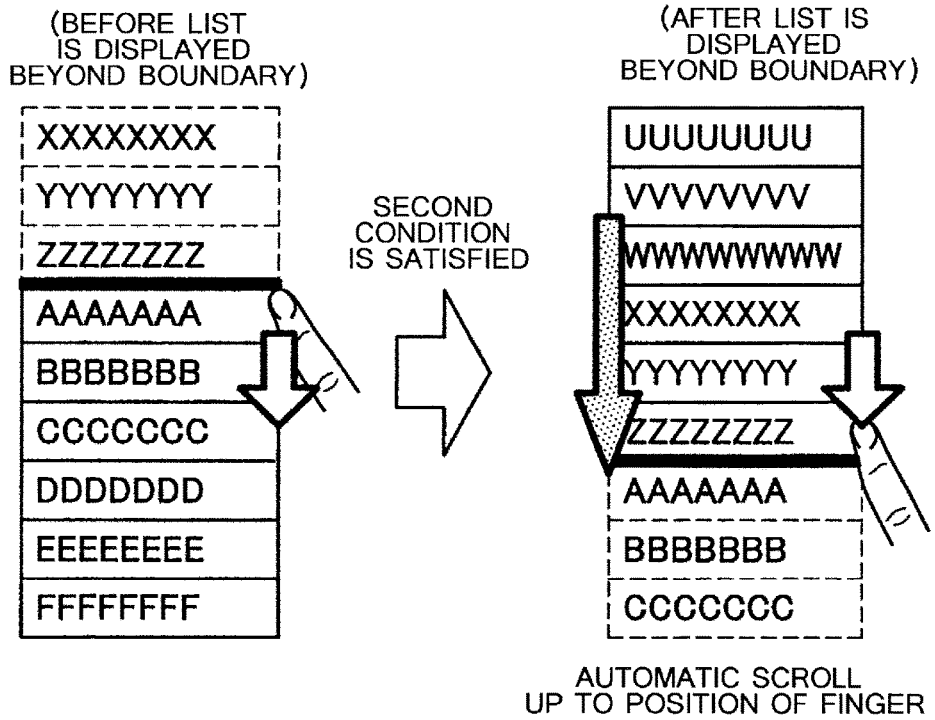

[Fig. 11]
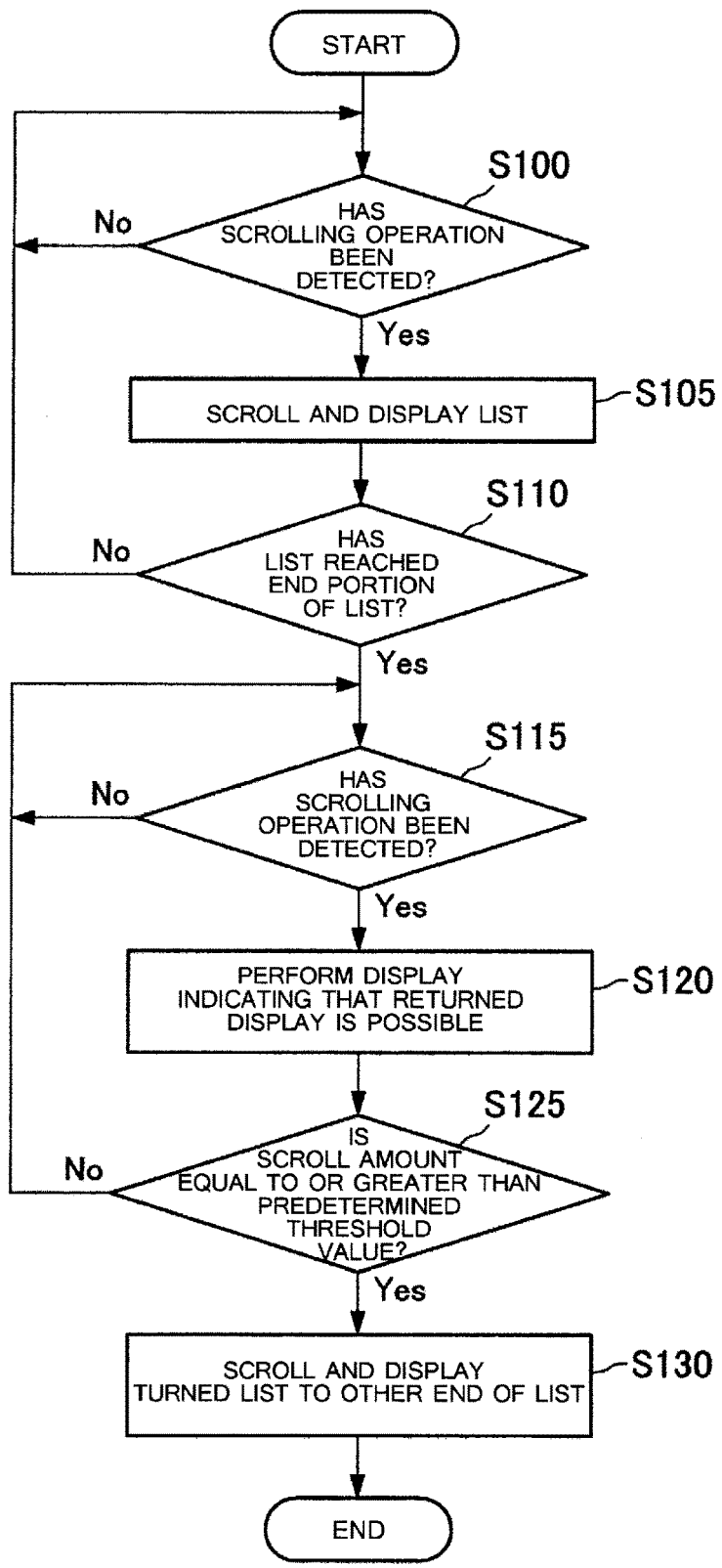

[Fig. 12]
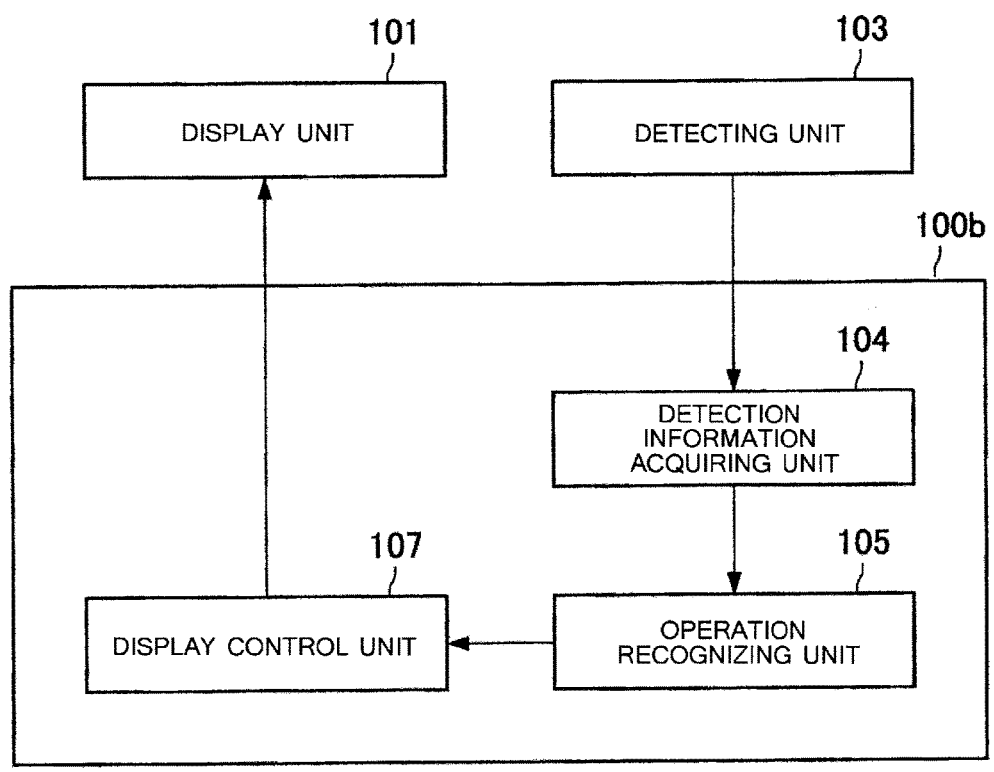

[Fig. 13]
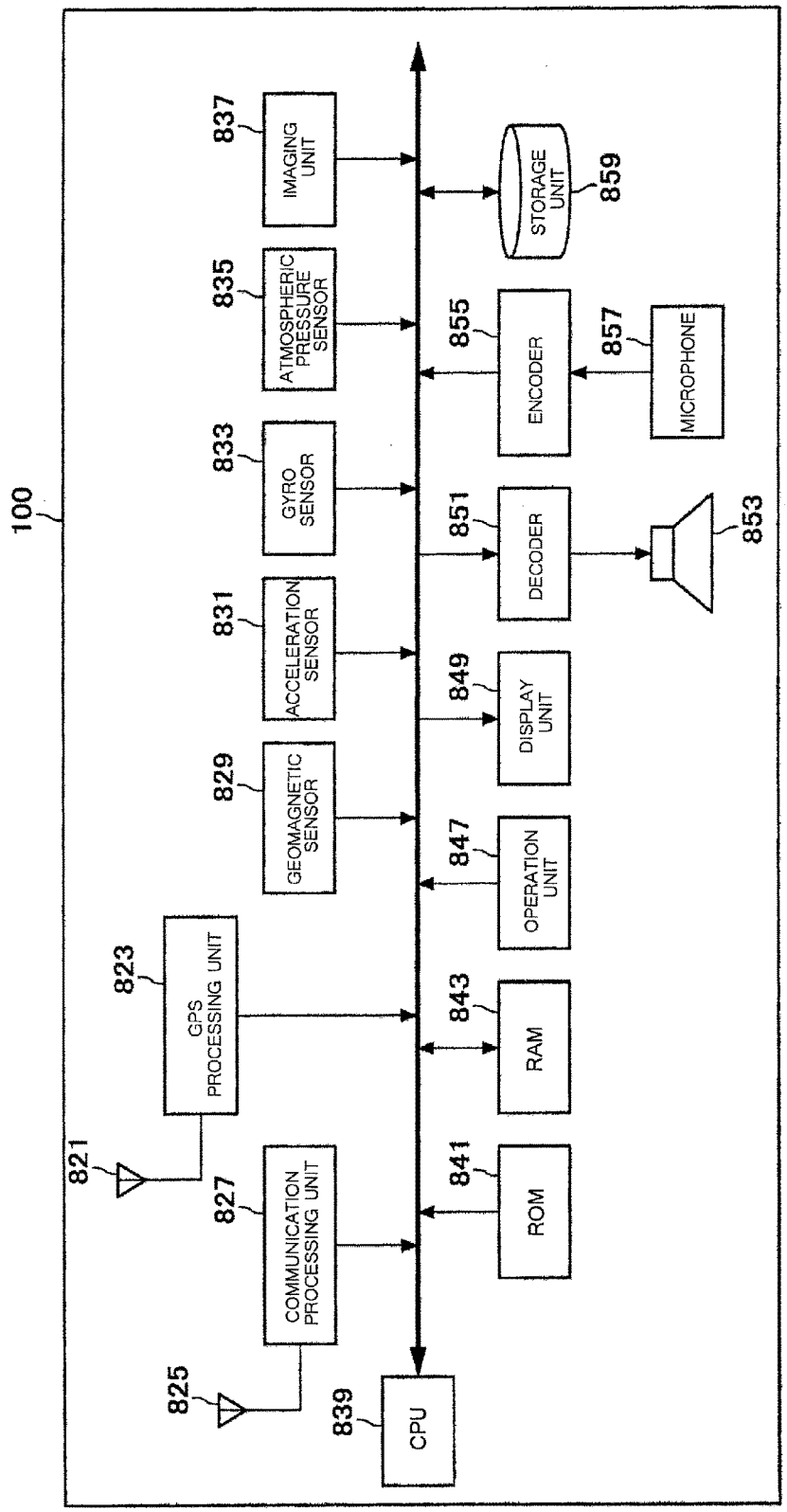

APPARATUS THAT CONTROLS SCROLLING OPERATION PAST AN EDGE OF AN IMAGE BASED ON A TYPE OF USER INPUT

TECHNICAL FIELD

The present disclosure relates to an information processing apparatus, an information processing method, and a program encoded on a non-transitory computer readable medium.

Background Art

When a display target is displayed in a display region of a screen, a part of the display target is sometimes displayed. For example, a part of a list of a plurality of items, a map, an image, or the like is displayed. The display state of the display target is changed in response to a scrolling operation, an expanding operation, a reducing operation, a rotating operation, or the like.

For example, Patent Document 1 discloses a user interface apparatus that displays a list with one hierarchy in the list having a hierarchical configuration. The user interface apparatus determines a hierarchy to be displayed based on the direction of a drag operation, and scrolls and displays the list in a scroll direction and at a scroll speed in accordance with the direction and the speed of the drag operation.

CITATION LIST

Patent Literature

PTL 1: Patent Document 1: Japanese Patent Application Laid-Open No. 2009-259163

SUMMARY

Technical Problem

However, in a case where a part of the display target can be displayed and the display state of the display target is changed in response to an operation of the user, the user may not recognize the boundary of the display target when the change condition of the display state is the same between the boundary and a portion other than the boundary.

In light of the above-described circumstances, it is desirable to improve operability when a part of a display target is displayed and the display state of the display target is changed in response to an operation of a user.

Solution to Problem

Accordingly, the present invention broadly comprises an apparatus, a method, and a non-transitory computer readable medium encoded with a program which causes the processor to perform the method. In one embodiment, the apparatus includes a control unit configured to control a display to display an image having a first edge and a second edge, the second edge on an opposite side of the image from the first edge, scroll through the image from the first edge to the second edge in response to a first user input, and continue scrolling past the second edge in response to a second user input such that the first edge of the image is displayed after the second edge of the image.

In another embodiment, the present invention includes a control unit configured to control a display to control a display to display a first image having a first edge and a second edge, the second edge being on an opposite side of the image from the first edge, the first image being larger that a display screen on which the first image is displayed, scroll through the image from the first edge to the second edge in response to a first user input, and continue scrolling past the second edge in response to a second user input such that a first edge of a second image is displayed after the second edge of the first image, the second user input being different than the first user input. According to another embodiment, there is provided an information processing apparatus including: an operation detecting unit that detects an operation input into an operation unit; and a display control unit that changes a display state of a display target when the operation detecting unit detects a first operation satisfying a predetermined first condition and a second operation satisfying a predetermined second condition. Based on boundary information associated with a specific display target which is the display target specified, the display control unit restrains the specific display target from being displayed on a display unit in response to reception of the first operation and displays the specific display target on the display unit in response to reception of the second operation.

According to the present disclosure, there is provided an information processing method including: detecting a first operation satisfying a predetermined first condition or a second operation satisfying a predetermined second condition; changing a display state of a display target in response to the first or second operation; restraining a specific display target, which is a display target specified, from being displayed on a display unit in response to reception of the first operation based on boundary information associated with the specific display target; and displaying the specific display target on the display unit in response to reception of the second operation.

According to the present disclosure, there is provided a program encoded on a non-transitory computer readable medium causing a computer to function as an information processing apparatus including an operation detecting unit that detects an operation input into an operation unit and a display control unit that changes a display state of a display target when the operation detecting unit detects a first operation satisfying a predetermined first condition and a second operation satisfying a predetermined second condition. Based on boundary information associated with a specific display target which is the display target specified, the display control unit restrains the specific display target from being displayed on a display unit in response to reception of the first operation and displays the specific display target on the display unit in response to reception of the second operation.

Advantageous Effects of Invention

According to the present disclosure described above, the operability can be improved when a part of the display target is displayed and the display state of the display target is changed in response to an operation of the user.

BRIEF DESCRIPTION OF DRAWINGS

FIG. 1 is a block diagram illustrating the functional configuration of an information processing apparatus according to a first embodiment of the present disclosure.

FIG. 2 is a diagram illustrating an example of display transition of a list displayed by the information processing apparatus according to the first embodiment.

FIG. 3 is a diagram illustrating another example of the display transition of the list displayed by the information processing apparatus according to the first embodiment.

FIG. 4 is a diagram illustrating an example of an effect showing an end point of the list displayed by the information processing apparatus according to the first embodiment.

FIG. 5 is a diagram illustrating another example of the effect showing an end point of the list displayed by the information processing apparatus according to the first embodiment.

FIG. 6 is a diagram illustrating still another example of the effect showing an end point of the list displayed by the information processing apparatus according to the first embodiment.

FIG. 7 is a diagram illustrating an example of an effect suggesting that the list is turned around and displayed beyond the end point of the list displayed by the information processing apparatus according to the first embodiment.

FIG. 8 is a diagram illustrating another example of the effect suggesting that the list is turned around and displayed beyond the end point of the list displayed by the information processing apparatus according to the first embodiment.

FIG. 9 is a diagram illustrating an example of an effect after the list is displayed beyond the boundary of the list displayed by the information processing apparatus according to the first embodiment.

FIG. 10 is a diagram illustrating another example of the effect after the list is displayed beyond the boundary of the list displayed by the information processing apparatus according to the first embodiment.

FIG. 11 is a flowchart illustrating an example of an operation of the information processing apparatus according to the first embodiment.

FIG. 12 is a block diagram illustrating the functional configuration of an information processing apparatus according to a second embodiment of the present disclosure.

FIG. 13 is a block diagram illustrating an example of a hardware configuration of the information processing apparatus according to the first and second embodiments of the present disclosure.

DESCRIPTION OF EMBODIMENTS

Preferred embodiments of the present disclosure will be described in detail with reference to the accompanying drawings. Throughout the specification and the drawings, the same reference numerals are given to constituent elements having substantially the same functional configuration and the description thereof will not be repeated.

In the specification and the drawings, different reference numerals are sometimes given to the end of the same reference numeral via a hyphen to distinguish a plurality of constituent elements having substantially the same functional configuration from each other. For example, a plurality of constituent elements having substantially the same functional configuration are distinguished as gap regions 11-1 and 11-2, as necessary. In the embodiments described below, different states of the same functional configuration are distinguished from each other by giving different reference numerals via a hyphen after the same reference numeral. However, when it is not necessary to distinguish the plurality of constituent elements having substantially the same functional configuration from each other, only the same reference numeral is given to the constituent elements. For example, when it is not necessary to distinguish the gap regions 11-1 and 11-2 from each other, the gap regions 11-1 and 11-2 are simply referred to as the gap regions 11.

The description will be made in the following order.
1. First Embodiment
1-1. Functional Configuration
1-2. Overview of List Display
1-3. Example of Effect Showing End Point
1-4. Example of Effect Suggesting that List Is Displayed beyond Boundary
1-5. Example of Effect After List Is Displayed Beyond Boundary
1-6. Example of Operation
2. Second Embodiment
3. Example of Hardware Configuration <1. First Embodiment>

(1-1. Functional Configuration)

First, the functional configuration of an information processing apparatus according to a first embodiment of the present disclosure will be described with reference to FIG. 1. FIG. 1 is a block diagram illustrating the functional configuration of the information processing apparatus according to the first embodiment of the disclosure.

An information processing apparatus 100a illustrated in FIG. 1 is an apparatus that operates based on a user's operation. Examples of the information processing apparatus 100a include a portable telephone, a personal computer (PC), a video processing apparatus, a game console, a home appliance, and a music reproducing apparatus.

The information processing apparatus 100a includes a display unit 101, a detecting unit 103, an operation recognizing unit 105, and a display control unit 107 as main units.

(Display Unit 101)

The display unit 101 has a function of providing a display screen to a user. The display unit 101 may be a display device such as a liquid crystal display (LCD) device or an organic light emitting diode (OLED) display device.

(Detecting Unit 103)

The detecting unit 103 has a function of detecting a position input by a pointing device on a display screen. Examples of the pointing device include a touch sensor, a mouse, a button, a trackball, and other controllers. In this embodiment, it is assumed that the detecting unit 103 is a touch sensor superimposed on the display unit 101 and detects the position of a finger F which is the operation body on the display screen. The touch sensor used here may be, for example, a contact type touch sensor that detects the position of the finger F touching on the display screen. Alternatively, the touch sensor used here may be a non-contact type touch sensor that detects the position of the finger F on the display screen in a non-contact manner. Alternatively, the touch sensor used here may detect a pushing operation of a user on the display screen.

(Operation Recognizing Unit 105)

The operation recognizing unit 105 has a function of recognizing a process indicated by an operation pattern input by the user. The operation pattern is determined based on the position of the operation body. Specifically, the operation pattern is determined based on various conditions such as a detection timing of the position of the operation body and a change pattern of the position of the operation body. The operation recognizing unit 105 determines the operation pattern to recognize a process associated with the operation pattern in advance. The operation recognizing unit 105 can recognize an operation, such as a scrolling operation, an expanding operation, a reducing operation, or a rotating operation, of changing the display state of a display target.

(Display Control Unit 107)

The display control unit 107 has a function of controlling display of a display screen on the display unit 101. The display control unit 107 can generate the display screen based on the process recognized by the operation recognizing unit 105 and display the display screen on the display unit 101. For example, the display control unit 107 can function as a region display unit that displays a display target on a predetermined display region. The display control unit 107 can function as a display state control unit that controls the display state of a display target. Here, the display target is a list of a plurality of items. However, the display target is not limited to the list. For example, the display target may be a map, an image, a web page, or the like. The display control unit 107 can display a part or the entirety of a display target on a display region. The display state of the display target is changed based on an operation recognized by the operation recognizing unit 105.

The display control unit 107 can display the display state of a display target in response to detection of a first operation satisfying a predetermined first condition or detection of a second operation satisfying a predetermined second condition. The display control unit 107 can restrain a specific display target from being displayed on the display unit in response to reception of the first operation based on boundary information associated with the specific display target which is the display target specified. The display control unit 107 can display the specific display target on the display unit 101, when the second operation is received in the state where the specific display target is restrained from being displayed. When the display target is a list and the beginning of the list is displayed, the specific display target is the termination of the list. When the termination of the list is displayed, the specific display target is the beginning of the list.

When the first operation satisfying the predetermined first condition is detected, the display control unit 107 can change the display state of the display target. Specifically, for example, the display target is a list and the first operation may be a normal scrolling operation. At this time, when the scrolling operation is detected, the display control unit 107 can scroll and change a portion displayed in the display region of the list. When the second operation satisfying the predetermined second condition is detected at a boundary set in advance as the display target, the display control unit 107 can change the display state of the display target. For example, specifically, when a scrolling operation of which an operation amount exceeds a predetermined threshold value is detected at one end (the beginning or the termination) of the list, the display control unit 107 can scroll and display the list by turning around the one end of the list to the other end of the list. At this time, the second condition is stricter than the first condition. The first and second conditions may be set based on at least one of a distance corresponding to the amount of the scrolling operation, a ratio of the length of a display region, and a time. For example, it is assumed here that the first condition is a condition in which the amount of the scrolling operation exceeds a predetermined first threshold value and the second condition is a condition in which the amount of the scrolling operation exceeds a second threshold value greater than the first threshold value. However, the present technology is not limited to this example. For example, the second condition may be set such that a new operation is performed in addition to the first condition. For example, the second condition may be set such that a state where the amount of the scrolling operation exceeds the first threshold value continues for a predetermined time.

On the assumption that one side of the boundary of the display target is referred to as a first side and the other side of the boundary of the display target is referred to as a second side, the display control unit 107 can display the first and second sides in different expression ways. When the first and second sides are displayed in different ways, a user recognizes that a boundary is present. When the display target is displayed beyond the boundary through the second operation, the display control unit 107 may reverse the expressions of the first and second sides. Thus, in such a configuration, the user can recognize that the display target is beyond the boundary. The display control unit 107 can display the display target on the first side in an expression corresponding to the operation amount of the first operation. At this time, the first side may be the other side (the other end of the list displayed when the second operation is performed) of the boundary. Here, the display control unit 107 may display the first side of the display target outside the display region.

When the first operation is detected at the boundary of the display target, the display control unit 107 can perform a display suggesting that the display target can be displayed beyond the boundary. For example, at this time, the display control unit 107 may display a mark (for example, an arrow) indicating that the list is turned around beyond the boundary and displayed. At this time, the display control unit 107 can display the mark in an expression way corresponding to the operation amount of the first operation. Specifically, the display control unit 107 may display the mark with a length corresponding to the operation amount of the first operation.

When the operation recognizing unit 105 recognizes an operation based on the position designated by an operation body on the display screen and the display target is detected through the second operation and is displayed beyond the boundary, the display control unit 107 can change the display state of the display target such that the position of the operation body is superimposed on the position of the boundary. Specifically, when the other end of the list is turned around and displayed beyond the boundary, the display control unit 107 may scroll and display the list so that the end of the list reaches the position of the operation body.

Examples of the function of the information processing apparatus 100a according to this embodiment have hitherto been described. The above-described respective constituent elements may be configured using general units or circuits or may be configured by hardware specialized for the functions of the respective constituent elements. Further, the functions of the respective constituent elements may be performed by reading a control program, which describes a processing order in which the functions are realized by an arithmetic device such as a central processing unit (CPU), from a storage medium such as a read-only memory (ROM) or a random access memory (RAM), which stores the control program, analyzing the control program, and executing the control program. Accordingly, a configuration to be appropriately used may be modified in accordance with a technical level at which this embodiment is realized.

A computer program configured to realize the functions of the information processing apparatus 100a according to the above-described embodiment may be created and mounted on a personal computer or the like. Further, a computer readable recording medium that stores the computer program may be provided. Examples of the recording medium include a magnetic disk, an optical disc, a magneto-optical disc, and a flash memory. Furthermore, the computer program may be delivered via a network or the like without use of a recording medium.

(1-2. Overview of List Display)

Next, the overview of list display according to this embodiment will be described with reference to FIGS. 2 and 3. FIG. 2 is a diagram illustrating an example of display transition of a list displayed in the information processing apparatus according to this embodiment. FIG. 3 is a diagram illustrating another example of the display transition of the list displayed by the information processing apparatus according to this embodiment.

First, the description will be made with reference to FIG. 2. The display control unit 107 of the information processing apparatus 100a can display a list of items including an item "AAAAAAAA" to an item "ZZZZZZZZ" For example, here, the item "AAAAAAAA" is referred to as a beginning of the list and the item "ZZZZZZZZ" is referred to as a termination of the list. However, the present invention also includes embodiments where scrolling is performed between different lists or images. For example, FIG. 2, state 3 would include the end of a first list and the start of a second list, rather than the end and the start of the same list as shown.

Referring to state 1, the display control unit 107 displays the item "AAAAAAAA" of the list to an item "FFFFFFFF" of the list in the display region. When the user performs a scrolling operation on the list with the finger F, the display control unit 107 can scroll and display the list in response to the scrolling operation. When the user continues the scrolling operation, the display control unit 107 can scroll and display the list to the termination of the list. The scroll display may be scrolled in an inertial manner in response to the scrolling operation of the user. That is, the display control unit 107 can control the display such that the list is scrolled in the inertial manner even when the user performs no operation with his/her finger. When the list is scrolled up to the termination of the list, the display control unit 107 can stop the scroll in the termination. That is, in the end portion of the list, the list is not scrolled in the inertial manner (state 2).

When the user further performs the scrolling operation in the end portion of the list, the display control unit 107 can turn around the beginning of the list and display the list. However, until the scrolling operation satisfies the second condition, the display control unit 107 performs a display suggesting that the display control unit 107 can turn around and display the list as in state 3. In state 3, when the user detaches the finger F before the second condition is satisfied, the display control unit 107 may return the display state to a state (state 4) where the termination of the list is displayed. On the other hand, when the second condition is satisfied by further performing the scrolling operation in state 3, the display control unit 107 can scroll and display the list beyond the boundary between the termination and the beginning of the list (state 5). For example, the display control unit 107 can scroll and display the list so that the beginning of the list reaches the end of the display region (state 6).

FIG. 3 illustrates another example of the display transition of the list. For example, when the user further performs the scrolling operation in a state where the display suggests that the list can be turned around and displayed, as in state 3, and thus the second condition is satisfied, the list is turned around beyond the boundary and is displayed (state 3-1). Then, the display control unit 107 may automatically scroll the list until the boundary is superimposed on the position of the finger F (state 7). State 7 is a state where an operation of scrolling the list beyond the boundary is not confirmed. For example, when the user performs a flicking operation upward or detaches the finger F from the screen, the state is returned to state 4 where the termination of the list is displayed. On the other hand, when the user performs a flicking operation downward in state 7, the display control unit may scroll and display the list so that the beginning of the list reaches the end of the display region (state 6).

(1-3. Example of Effect Showing End Point)

Next, an example of an effect not showing the preceding portion beyond the boundary from an end point will be described with reference to FIGS. 4 to 6. FIG. 4 is a diagram illustrating an example of an effect showing an end point of the list displayed by the information processing apparatus according to this embodiment. FIG. 5 is a diagram illustrating another example of the effect showing an end point of the list displayed by the information processing apparatus according to this embodiment. FIG. 6 is a diagram illustrating further another example of the effect showing an end point of the list displayed by the information processing apparatus according to this embodiment.

For example, when the user performs a scrolling operation from the initial state where a boundary B is displayed at the end of the display region, as illustrated in FIG. 4, the display control unit 107 can display a new gap region 11 in accordance with the amount of the scrolling operation when the scrolling operation is performed. The gap region is displayed such that a gap between the boundary B and the beginning (here, the item "AAAAAAAA") of the list is opened. The display control unit 107 can close the gap region 11 and return the display state of the list to the original state of the list, when the user stops the scrolling operation.

As illustrated in FIG. 5, when the user stops the scrolling operation, the display control unit 107 may not completely close the gap region 11. For example, the display control unit 107 may control the display of the gap region 11 such that the vertical width of a gap region 11-2 is narrower than that of the gap region 11-1 when the scrolling operation is performed.

The effect showing the end point is not limited to the display of the gap region 11. For example, as illustrated in FIG. 6, the display control unit 107 may display the list such that the vertical width of a part of an item of the list is broadened when the scrolling operation is performed. The display control unit 107 can return the vertical width of the item to the original state when the user stops the scrolling operation.

The user can recognize the end point of the list by the above-described effect. For example, when the scroll is simply stopped at the end point without use of the effect showing the end point, it is difficult for the user to explicitly recognize whether the reason why the scroll operation is not performed is because the scroll operation stops at the end point or because the information processing apparatus 100a has not recognized the operation. Accordingly, in such a configuration, the user can discriminate and recognize between the case in which the information processing apparatus 100a may not recognize the operation and the case in which the end point appears and thus the scrolling operation may not be further performed.

(1-4. Example of Effect Suggesting that List is Displayed Beyond Boundary)

Next, an example of an effect suggesting that the list can be displayed beyond the boundary from the end point will be described with reference to FIGS. 7 and 8. FIG. 7 is a diagram illustrating an example of the effect suggesting that the list can be turned around and displayed beyond the end point of the list displayed by the information processing apparatus according to this embodiment. FIG. 8 is a diagram illustrating another example of the effect suggesting that the list is turned around and displayed beyond the end point of the list displayed by the information processing apparatus according to this embodiment.

For example, when the user performs the scrolling operation from the initial state where the boundary B is displayed at the end of the display region, as illustrated in FIG. 7, the display control unit 107 may display a mark M suggesting that the list can be turned around beyond the boundary and displayed when the scrolling operation is performed. The display control unit 107 can stop displaying the mark M when the user stops the scrolling operation. For example, the mark M can be displayed outside the display region of the list. Further, the display control unit 107 may display the mark M so as to have a size corresponding to the amount of the scrolling operation. For example, the display control unit 107 may display the mark M such that a size is larger as the amount of the scrolling operation is larger.

When the user performs the scrolling operation from the initial state where the boundary B is displayed at the end of the display region, as illustrated in FIG. 8, the display control unit 107 can display the first side which is a part of the other end (here, the termination) of the list outside the display region in a different way from the second side at the time of the scrolling operation. The display control unit 107 can stop displaying the first side, when the user stops the scrolling operation. The first side may be expressed with a character paler than the second side.

The user can recognize the end portion of the list and can also recognize that the list can be turned around and displayed beyond the end portion of the list by using the above-described effect.

(1-5. Example of Effect after List is Displayed Beyond Boundary)

Next, an example of an effect after the list is displayed beyond the boundary will be described with reference to FIGS. 9 and 10. FIG. 9 is a diagram illustrating an example of the effect after the list is displayed beyond the boundary of the list displayed by the information processing apparatus according to this embodiment. FIG. 10 is a diagram illustrating another example of the effect after the list is displayed beyond the boundary of the list displayed by the information processing apparatus according to this embodiment.

For example, as illustrated in FIG. 9, the display control unit 107 may change the expression ways of the first and second sides before and after the list is displayed beyond the boundary. At this time, the display control unit 107 can reverse the expression ways of the first and second sides.

As illustrated in FIG. 10, the display control unit 107 can automatically scroll and display the list so that the boundary B reaches the position of the finger F after the list is displayed beyond the boundary. Thereafter, the display control unit 107 can control the display of the list in accordance with the direction of a flicking operation performed by the user, as described above with reference to FIG. 3. Alternatively, the display control unit 107 may control the display of the list so that the list is returned to the state before the list is displayed beyond the boundary, when the user detaches the finger from the state.

(1-6. Example of Operation)

Next, an example of an operation of the information processing apparatus according to this embodiment will be described with reference to FIG. 11. FIG. 11 is a flowchart illustrating an example of an operation of the information processing apparatus according to this embodiment.

First, when the operation recognizing unit 105 detects that the user performs a scrolling operation based on the position of an operation body detected by the detecting unit 103 (S100), the display control unit 107 scrolls and displays the list in response to the scrolling operation (S105). The display control unit 107 can display the list scrolled by the scroll amount in response to the scrolling operation. The scrolling operation may be a so-called flicking operation. When the flicking operation is detected, the display control unit 107 can scroll the list in an inertial manner.

Next, the display control unit 107 determines whether the list displayed in the display region reaches an end portion (S110). When the display control unit 107 determines that the list reaches the end portion, the display control unit 107 determines whether the scrolling operation is detected by the operation recognizing unit 105 (S115). Here, when the scrolling operation is detected, the display control unit 107 performs a display indicating that a turning display is possible (S120). For example, the display may be the mark M such as an arrow or may be a part of the turned list.

When the operation recognizing unit 105 recognizes that the scroll amount detected by the detecting unit 103 is equal to or greater than a predetermined threshold value (second threshold value) (Yes at S125), the display control unit 107 scrolls and displays the turned list to the other end portion of the list (S130). p <2. Second Embodiment>

Next, the functional configuration of an information processing apparatus according to a second embodiment of the present disclosure will be described with reference to FIG. 12. FIG. 12 is a block diagram illustrating the functional configuration of the information processing apparatus according to the second embodiment of the present disclosure.

An information processing apparatus 100*b* according to the second embodiment of the present disclosure includes a detection information acquiring unit 104, an operation recognizing unit 105, and a display control unit 107 as the main units. Compared to the information processing apparatus 100*a* according to the first embodiment of the present disclosure, the information processing apparatus 100*b* is different from the information processing apparatus 100*a* in that the information processing apparatus 100*b* does not include the display unit 101 and the detecting unit 103. Therefore, the information processing apparatus 100*b* includes the detection information acquiring unit 104 that acquires detection information from an external detecting unit 103. Only dif-ferences between the information processing apparatus 100*a* according to the first embodiment and the information processing apparatus 100*b* will be described below and the description of the common constituent elements will not be repeated here.

(Detection Information Acquiring Unit 104)

The detection information acquiring unit 104 has a function of acquiring detection information generated when the detecting unit 103 detects the position of an operation body. The detection information acquiring unit 104 can input the acquired detection information into the operation recognizing unit 105.

<3. Example of Hardware Configuration>

Next, an example of a hardware configuration of the information processing apparatus according to the first and second embodiments of the present disclosure will be described with reference to FIG. 13. FIG. 13 is a block diagram illustrating an example of the hardware configuration of the information processing apparatus according to the first and second embodiments of the present disclosure.

For example, the information processing apparatus 100 includes a GPS antenna 821, a GPS processing unit 823, a communication antenna 825, a communication processing unit 827, a geomagnetic sensor 829, an acceleration sensor 831, a gyro sensor 833, an atmospheric pressure sensor 835, an imaging unit 837, a central processing unit (CPU) 839, a read-only memory (ROM) 841, a random access memory (RAM) 843, an operation unit 847, a display unit 849, a decoder 851, a speaker 853, an encoder 855, a microphone 857, and a storage unit 859.

(GPS Antenna 821)

The GPS antenna 821 is an example of an antenna that receives signals from positioning satellites. The GPS antenna 821 can receive GPS signals from a plurality of GPS satellites and input the received GPS signal into the GPS processing unit 823.

(GPS Processing Unit 823)

The GPS processing unit 823 is an example of a calculating unit that calculates position information based on the signals received from the positioning satellites. The GPS processing unit 823 calculates the current position information based on the plurality of GPS signals input from the GPS antenna 821 and outputs the calculated position information. Specifically, the GPS processing unit 823 calculates the position of each GPS satellite based on trajectory data of the GPS satellite and calculates the distance between each GPS satellite and the terminal apparatus 100 based on a time difference between transmission and reception times of the GPS signal. Then, the current three-dimensional position can be calculated based on the calculated position of each GPS satellite and the distance between each GPS satellite and the terminal apparatus 100. Further, the trajectory data of the GPS satellite used here may be included in, for example, the GPS signal. Furthermore, the trajectory data of the GPS satellite may be acquired from an external server via the communication antenna 825.

(Communication Antenna 825)

The communication antenna 825 is an antenna that has a function of receiving a communication signal via, for example, a portable communication network or a wireless local area network (LAN) communication network. The communication antenna 825 can supply the received signal to the communication processing unit 827.

(Communication Processing Unit 827)

The communication processing unit 827 has a function of performing various kinds of signal processing on the signal supplied from the communication antenna 825. The communication processing unit 827 can supply a digital signal generated from the supplied analog signal to the CPU 839.

(Geomagnetic Sensor 829)

The geomagnetic sensor 829 is a sensor that detects geomagnetism as a voltage value. The geomagnetic sensor 829 may be a triaxial geomagnetic sensor that detects each of the geomagnetisms in the X, Y, and Z axis directions. The geomagnetic sensor 829 can supply the detected geomagnetism data to the CPU 839.

(Acceleration Sensor 831)

The acceleration sensor 831 is a sensor that detects acceleration as a voltage value. The acceleration sensor 831 may be a triaxial acceleration sensor that detects each of the accelerations in the X, Y, and Z axis directions. The acceleration sensor 831 can supply the detected acceleration data to the CPU 839.

(Gyro Sensor 833)

The gyro sensor 833 may be a kind of a measuring device that detects an angle or an angular velocity of an object. The gyro sensor 833 may be a triaxial gyro sensor that detects a change angle (angular velocity) of a rotation angle as a voltage value around the X, Y, and Z axes. The gyro sensor 833 can supply the detected angular velocity data to the CPU 839.

(Atmospheric Pressure Sensor 835)

The atmospheric pressure sensor 835 is a sensor that detects a surrounding pressure as a voltage value. The atmospheric pressure sensor 835 can detect a pressure at a predetermined sampling frequency and supply the detected pressure data to the CPU 839.

(Imaging Unit 837)

The imaging unit 837 has a function of photographing a still image or a moving image through a lens under the control of the CPU 839. The imaging unit 837 may store the photographed image in the storage unit 859.

(CPU 839)

The CPU 839 functions as an arithmetic device and a control device to control all of the operating processes in the information processing apparatus 100 in accordance with various kinds of programs. The CPU 839 may be a microprocessor. The CPU 839 can realize various functions in accordance with various kinds of programs.

(ROM 841 and RAM 843)

The ROM 841 can store programs, calculation parameters, or the like used by the CPU 839. The RAM 843 can temporarily store programs used in execution of the CPU 839, or parameters or the like appropriately changed in the execution.

(Operation Unit 847)

The operation unit 847 has a function of generating an input signal used for a user to perform a desired operation. The operation unit 847 may include an input unit, such as a touch sensor, a mouse, a keyboard, a button, a microphone, a switch, or a lever, with which a user inputs information and an input control circuit configured to generate an input signal based on the input of the user and output the input signal to the CPU 839.

(Display Unit 849)

The display unit 849 is an example of an output device and may be a display device such as a liquid crystal display (LCD) device or an organic light emitting diode (OLED) display device. The display unit 849 can supply information by displaying a screen for a user.

(Decoder 851 and Speaker 853)

The decoder 851 has a function of performing decoding, analog conversion, or the like on input data under the control of the CPU 839. The decoder 851 performs the decoding, the analog conversion, and the like on audio data input via, for example, the communication antenna 825 and the communication processing unit 827 and outputs an audio signal to the speaker 853. The speaker 853 can output audio based on the audio signal supplied from the decoder 851.

(Encoder 855 and Microphone 857)

The encoder 855 has a function of performing digital conversion, encoding, or the like on input data under the control of the CPU 839. The encoder 855 can perform the digital conversion, the encoding, and the like on an audio signal input from the microphone 857 and output the audio data. The microphone 857 can collect audio and output the audio as an audio signal.

(Storage Unit 859)

The storage unit 859 is a data storage device and may include a storage medium, a recording device that records data in a storage medium, a reading device that reads data from a storage medium, and a deleting device that deletes data recorded in a storage medium. Here, for example, a non-volatile memory such as a flash memory, a magnetoresistive random access memory (MRAM), a ferroelectric random access memory (FeRAM), a phase change random access memory (PRAM), or an elec-tronically erasable and programmable read-only memory (EEPROM), or a magnetic recording medium such as a hard disk drive (HDD) may be used as the storage medium.

The preferred embodiments of the present disclosure have hitherto been described in detail with reference to the accompanying drawings, but the technical scope of the present disclosure is not limited thereto. It is apparent to those skilled in the art of the present disclosure that the present disclosure is modified or amended in various forms within the scope of the technical spirit described in claims, and the modifications and amendments are, of course, construed to pertain to the technical scope of the present disclosure.

For example, in the above-described embodiment, the display target is a list having a plurality of items, but the present technology is not limited thereto. For example, the display target may include a map, an image, a web page, and the like. In the above-described embodiment, the case in which the boundary of the list is the end point has been described, but the present technology is not limited thereto. The boundary is not limited to the end point, but is applicable to all of the set boundaries.

In the above-described embodiments, the information processing apparatus 100 operated with the touch sensor and the finger has been described, but the present technology is not limited thereto. For example, the information processing apparatus 100 may be operated by a button, a mouse, a trackball, and other controllers. Further, the information processing apparatus 100 may be an apparatus that is operated by recognizing a gesture using an imaging apparatus.

In the specification, the steps described in the flowchart include not only processes performed chronologically in the described order but also processes performed in parallel or separately even when the processes are not necessarily performed chronologically. Of course, the order of the steps processed chronologically may be changed appropriately, as necessary.

The configurations described below also pertain to the technical scope of the present disclosure.

(1) An apparatus including:
a control unit configured to
control a display to display an image having a first edge and a second edge, the second edge on an opposite side of the image from the first edge,
scroll through the image from the first edge to the second edge in response to a first user input, and
continue scrolling past the second edge in response to a second user input, wherein the second user input being different than the first user input.

(2) The apparatus according to (1), wherein the control unit controls the display to display a boundary between the first edge of the image and the second edge of the image.

(3) The apparatus according to (2), wherein the control unit controls the display to display a gap between the boundary and the first edge of the image when a scrolling operation is performed, and to close the gap when the scrolling operation is ended.

(4) The apparatus according to (1) to (3), wherein the control unit controls the display to display a list of items as the image, to stretch items near the first edge of the list when a scrolling operation is performed, and to return the items near the first edge to an original size when the scrolling operation is ended.

(5) The apparatus according to (1) to (4), wherein the control unit controls the display to display an icon representing the second edge of the image when a scrolling operation is performed, and to remove the icon when the scrolling operation is ended.

(6) The apparatus according to (2), wherein the control unit controls the display to display the second edge of the image on an opposite side of the boundary from the first edge when a backward scrolling operation is performed, and to remove the second edge of the image when the scrolling operation is ended.

(7) The apparatus according to (1) to (6), wherein the control unit controls the display to display a first indicator for the first edge of the image and a second indicator for the second edge of the image, and to display the second indicator for the first edge of the image and the first indicator for the second edge of the image when a command is entered.

(8) The apparatus according to (1) to (7), wherein the control unit configured to continue scrolling past the second edge in response to a second user input such that the first edge of the image is displayed after the second edge of the image.

(9) A method including:
controlling a display to display an image having a first edge and a second edge, the second edge on an opposite side of the image from the first edge;
scrolling through the image from the first edge to the second edge in response to a first user input, and
continuing scrolling past the second edge in response to a second user input such that the first edge of the image is displayed after the second edge of the image.

(10) A non-transitory computer readable medium encoded with a program that, when loaded on a processor, causes the processor to perform a method including:
controlling a display to display an image having a first edge and a second edge, the second edge on an opposite side of the image from the first edge;
scrolling through the image from the first edge to the second edge in response to a first user input, and
continuing scrolling past the second edge in response to a second user input such that the first edge of the image is displayed after the second edge of the image.

(11) An apparatus including:
a control unit configured to
control a display to display a first image having a first edge and a second edge, the second edge being on an opposite side of the image from the first edge, the first image being larger that a display screen on which the first image is displayed,
scroll through the image from the first edge to the second edge in response to a first user input, and
continue scrolling past the second edge in response to a second user input such that a first edge of a second image is displayed after the second edge of the first image, the second user input being different than the first user input.

(12) The apparatus according to (11), wherein the control unit controls the display to display a same image as the first image and the second image.

(13) The apparatus according to (11) or (12), wherein the control unit controls the display to display a boundary between the second edge of the first image and the first edge of the second image.

(14) The apparatus according to (13), wherein the control unit controls the display to display a gap between the boundary and the first edge of the second image when a scrolling operation is performed, and to close the gap when the scrolling operation is ended.

(15) The apparatus according to (11) to (14), wherein the control unit controls the display to display a list of items as the second image, to stretch items near the first edge of the list when a scrolling operation is performed, and to return the items near the first edge to an original size when the scrolling operation is ended.

(16) The apparatus according to (11) to (15), wherein the control unit controls the display to display an icon representing the second edge of the first image when a scrolling operation is performed, and to remove the icon when the scrolling operation is ended.

(17) The apparatus according to (13), wherein the control unit controls the display to display the second edge of the first image on an opposite side of the boundary from the first edge of the second image when a backward scrolling operation is performed, and to remove the second edge of the first image when the scrolling operation is ended.

(18) The apparatus according to (11) to (17), wherein the control unit controls the display to display a first indicator for the first edge of the second image and a second indicator for the second edge of the first image, and to display the second indicator for the first edge of the second image and the first indicator for the second edge of the first image when a command is entered.

(19) A method including:

controlling a display to display a first image having a first edge and a first edge, the second edge on an opposite side of the image from the first edge, the first image being larger that a display screen on which the first image is displayed, scrolling through the image from the first edge to the second edge in response to a first user input; and continuing scrolling past the second edge in response to a second user input such that a first edge of a second image is displayed after the second edge of the first image, the second user input being different than the first user input.

(20) A non-transitory computer readable medium encoded with a program that, when loaded on a processor, causes the processor to perform a method including:

controlling a display to display a first image having a first edge and a first edge, the second edge on an opposite side of the image from the first edge, the first image being larger that a display screen on which the first image is displayed, scrolling through the image from the first edge to the second edge in response to a first user input; and continuing scrolling past the second edge in response to a second user input such that a first edge of a second image is displayed after the second edge of the first image, the second user input being different than the first user input.

REFERENCE SIGNS LIST

100 Information processing apparatus
101 Display unit
103 Detecting unit
105 Operation recognizing unit
107 Display control unit

The invention claimed is:

1. An apparatus comprising:
   circuitry configured to
      control a display to display an image of a list of items, the list having a first edge and a second edge, the second edge being on an opposite side of the image from the first edge, the first edge being a beginning of the list, the second edge being an end of the list, a size of the image of the list being larger than a size of the display and an entirety of the image of the list being not displayable in a display region of the display without scrolling the image;
      determine whether either a distance of a drag operation on the display exceeds a first predetermined threshold, or a ratio of the distance of the drag operation to a length of the display region exceeds a second predetermined threshold;
      scroll through the image from the first edge to the second edge without scrolling past the second edge in response to the drag operation while controlling the display to display a first area of the image of the list not passing the second edge in a first expression way and controlling the display to display a second area of the image of the list passing the second edge in a second expression way different from the first expression way in a case that circuitry determines that the distance does not exceed the first predetermined threshold, or that the ratio does not exceed the second predetermined threshold; and
      continue scrolling past the second edge in response to the drag operation while controlling the display to display the first area in the second expression way and controlling the display to display the second area in the first expression way by reversing the first and second expression ways of the first and second areas in a case that circuitry determines that the distance exceeds the first predetermined threshold, or that the ratio exceeds the second predetermined threshold.

2. The apparatus according to claim 1, wherein the circuitry controls the display to display a boundary between the first edge of the image and the second edge of the image.

3. The apparatus according to claim 2, wherein the circuitry controls the display to display a gap between the boundary and the first edge of the image when the drag operation is performed on the display, and to close the gap when the drag operation is ended.

4. The apparatus according to claim 1, wherein the circuitry controls the display to stretch the items near the first edge of the list when the drag operation is performed on the display, and to return the items near the first edge to an original size when the drag operation is ended.

5. The apparatus according to claim 1, wherein the circuitry controls the display to display an icon representing the second edge of the image when the drag operation is performed on the display, and to remove the icon when the drag operation is ended.

6. The apparatus according to claim 2, wherein the circuitry controls the display to display the second edge of the image on an opposite side of the boundary from the first edge when a backward drag operation is performed on the display, and to remove the second edge of the image when the drag operation is ended.

7. The apparatus according to claim 1, wherein the circuitry controls the display to display a first indicator for the first edge of the image and a second indicator for the second edge of the image, and to display the second indicator for the first edge of the image and the first indicator for the second edge of the image when a command is entered.

8. The apparatus according to claim 1, wherein the circuitry configured to continue scrolling past the second edge in response to the drag operation in the case that circuitry determines that the distance exceeds the first predetermined threshold, or that the ratio exceeds the second predetermined threshold such that the first edge of the image is displayed after the second edge of the image.

9. A method comprising:

controlling a display to display an image of a list of items, the list having a first edge and a second edge, the second edge on an opposite side of the image from the first edge, the first edge being a beginning of the list, the second edge being an end of the list, a size of the image of the list being larger than a size of the display and an entirety of the image of the list being not displayable in a display region of the display without scrolling the image;

determining, using circuitry, whether either a distance of a drag operation on the display exceeds a first predetermined threshold, or a ratio of the distance of the drag operation to a length of the display region exceeds a second predetermined threshold;

scrolling through the image from the first edge to the second edge without scrolling past the second edge in response to the drag operation while controlling the display to display a first area of the image of the list not passing the second edge in a first expression way and controlling the display to display a second area of the image of the list passing the second edge in a second expression way different from the first expression way in a case that circuitry determines that the distance does not exceed the first predetermined threshold, or that the ratio does not exceed the second predetermined threshold; and continuing scrolling past the second edge in response to the drag operation while controlling the display to display the first area in the second expression way and displaying the second area in the first expression way by reversing the first and second expression ways of the first and second areas in a case that circuitry determines that the distance exceeds the first predetermined threshold, or that the ratio exceeds the second predetermined threshold.

10. A non-transitory computer readable medium encoded with a program that, when loaded on a processor, causes the processor to perform a method comprising;

controlling a display to display an image of a list of items, the list having a first edge and a second edge, the second edge on an opposite side of the image from the first edge, the first edge being a beginning of the list, the second edge being an end of the list, a size of the image of the list being larger than a size of the display and an entirety of the image of the list being not displayable in a display region of the display without scrolling the image;

determining whether either a distance of a drag operation on the display exceeds a first predetermined threshold, or a ratio of the distance of the drag operation to a length of the display region exceeds a second predetermined threshold;

scrolling through the image from the first edge to the second edge without scrolling past the second edge in response to the drag operation while controlling the display to display a first area of the image of the list not passing the second edge in a first expression way and controlling the display to display a second area of the image of the list passing the second edge in a second expression way different from the first expression way in a case that it is determined that the distance does not exceed the first predetermined threshold, or that the ratio does not exceed the second predetermined threshold; and continuing scrolling past the second edge in response to the drag operation while controlling the display to display the first area in the second expression way and controlling the display to display the second area in the first expression way by reversing the first and second expression ways of the first and second areas in a case that circuitry determines that the distance exceeds the first predetermined threshold, or that the ratio exceeds the second predetermined threshold.

11. The apparatus according to claim 1, wherein the circuitry is configured to continue scrolling past the second edge in response to the drag operation in the case that circuitry determines that the distance exceeds the first predetermined threshold, or that the ratio exceeds the second predetermined threshold such that a first edge of a second image is displayed after the second edge of the image.

12. The apparatus according to claim 11, wherein the circuitry controls the display to display a boundary between the second edge of the image and the first edge of the second image.

13. The apparatus according to claim 12, wherein the circuitry controls the display to display a gap between the boundary and the first edge of the second image when a scrolling operation is performed, and to close the gap when the scrolling operation is ended.

14. The apparatus according to claim 11, wherein the image and the second image are same.

15. The apparatus according to claim 1, wherein the first expression way is displaying the image of the list using a solid line, and the second expression way is displaying the image of the list using a dashed line.

* * * * *